(12) United States Patent
Ikuta et al.

(10) Patent No.: US 11,707,776 B2
(45) Date of Patent: Jul. 25, 2023

(54) POWER TOOL

(71) Applicant: MAKITA CORPORATION, Anjo (JP)

(72) Inventors: Hiroki Ikuta, Anjo (JP); Yosuke Naoi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/567,190

(22) Filed: Jan. 3, 2022

(65) Prior Publication Data
US 2022/0226881 A1   Jul. 21, 2022

(30) Foreign Application Priority Data

Jan. 18, 2021   (JP) ................................. 2021-005484

(51) Int. Cl.
| | |
|---|---|
| *B21J 15/26* | (2006.01) |
| *B21J 15/28* | (2006.01) |
| *B21J 15/10* | (2006.01) |
| *F16H 3/00* | (2006.01) |
| *F16H 1/46* | (2006.01) |
| *B25F 5/00* | (2006.01) |
| *B21J 15/02* | (2006.01) |
| *B21J 15/04* | (2006.01) |

(52) U.S. Cl.
CPC .............. *B21J 15/26* (2013.01); *B21J 15/105* (2013.01); *B21J 15/28* (2013.01); *B25F 5/001* (2013.01); *F16H 1/46* (2013.01); *F16H 3/005* (2013.01); *B21J 15/022* (2013.01); *B21J 15/043* (2013.01)

(58) Field of Classification Search
CPC .. F16H 3/005; F16H 1/46; F16H 3/003; B21J 15/022; B21J 15/043–045; B21J 15/105; B21J 15/16; B21J 15/26; B21J 15/28–285; B25F 5/001
See application file for complete search history.

(56) References Cited

U.S. PATENT DOCUMENTS

| | | | | |
|---|---|---|---|---|
| 5,730,232 A | * | 3/1998 | Mixer | ................. B25B 23/0078 173/176 |
| 2010/0304913 A1 | * | 12/2010 | Su | ........................... F16H 3/005 475/151 |
| 2019/0314888 A1 | | 10/2019 | Ikuta et al. | |

FOREIGN PATENT DOCUMENTS

| | | | | |
|---|---|---|---|---|
| DE | 102019107380 A1 | * | 9/2020 | |
| JP | 2012125898 A | * | 7/2012 | ............. B23D 47/12 |
| JP | 2018-103257 A | | 7/2018 | |

OTHER PUBLICATIONS

Translation of DE-102019107380-A1 (Year: 2020).*
Translation of JP-2012125898-A (Year: 2012).*

* cited by examiner

*Primary Examiner* — Matthew P Travers
(74) *Attorney, Agent, or Firm* — Oliff PLC (57) ABSTRACT

A power tool includes a motor and a gear speed reducer. The motor has a motor shaft that is rotatable in a normal direction and in a reverse direction. The gear speed reducer is operably coupled to the motor shaft. The gear speed reducer is configured such that a reduction ratio of the gear speed reducer is changed in response to a change of a rotation direction of the motor shaft.

11 Claims, 7 Drawing Sheets

POWER TOOL

CROSS-REFERENCE TO RELATED APPLICATION

The present application claims priority to Japanese patent application No. 2021-005484 filed on Jan. 18, 2021, the contents of which are hereby fully incorporated herein by reference.

TECHNICAL FIELD

The present disclosure relates to a power tool.

BACKGROUND

In some known power tools, a motor is rotatable in two directions, that is, in a normal direction and in a reverse direction. Such known power tools may be configured to perform different actions according to whether the motor rotates in the normal direction or in the reverse direction. For example, Japanese Unexamined Patent Application Publication No. 2018-103257 discloses a fastening tool that is configured to swage a fastener by moving a screw shaft rearward when the motor rotates in the normal direction and to return the screw shaft forward to an initial position when the motor rotates in the reverse direction.

SUMMARY

In power tools like the above-described fastening tool that performs different actions according to the rotation direction of the motor, required rotation speed and output torque may differ, depending on each action.

Accordingly, it is one, non-limiting object of the present disclosure to provide an improvement in a power tool that performs different actions according to a rotation direction of a motor.

One, non-limiting aspect of the present disclosure herein provides a power tool that includes a motor and a gear speed reducer. The motor has a motor shaft that is rotatable in two directions, that is, in a normal direction and in a reverse direction. The gear speed reducer is operably coupled to the motor shaft. The gear speed reducer is configured such that a reduction ratio of the gear speed reducer is changed in response to a change of a rotation direction of the motor shaft.

According to this aspect, the reduction ratio of the gear speed reducer, and thus the rotation speed (output speed) of an output shaft of the gear speed reducer and torque outputted from the gear speed reducer (output torque of the gear speed reducer) can be changed, according to whether the motor shaft rotates in the normal direction or in the reverse direction. Thus, the power tool can selectively perform two actions that are different in required speed and torque simply by changing the rotation direction of the motor without need for controlling the rotation speed of the motor.

DETAILED DESCRIPTION OF THE EMBODIMENTS

In one non-limiting embodiment according to the present disclosure, the gear speed reducer may include at least one planetary gear mechanism. The at least one planetary gear mechanism may each include a sun gear, an internal gear, a carrier and a plurality of planetary gears. The gear speed reducer may be configured such that the reduction ratio is changed in response to a change of the number of the at least one planetary gear mechanism that functions effectively. According to this embodiment, the gear speed reducer can be made small in size and can provide a large reduction ratio by utilizing the planetary gear mechanism, compared with a gear speed reducer utilizing a combination of spur gears or other gears. Further, the gear speed reducer can rationally change the reduction ratio by changing the number of the at least one planetary gear mechanism that function effectively (i.e. the number of effective stages of the at least one planetary gear mechanism).

In addition or in the alternative to the preceding embodiment, the power tool may further include a one-way clutch and a lock mechanism that is operably coupled to the one-way clutch. The one-way clutch may be disposed in a transmission path from the motor shaft to the sun gear. The one-way clutch may be configured to permit rotation of the sun gear relative to the one-way clutch while the motor shaft rotates in a first direction. Also, the one-way clutch may be configured to rotate integrally with the sun gear while the motor shaft rotates in a second direction. The first direction here is one of the normal direction and the reverse direction, and the second direction is the other of the normal direction and the reverse direction. The lock mechanism may be configured to lock the internal gear to be non-rotatable while the one-way clutch permits the relative rotation of the sun gear. Also, the lock mechanism may be configured to cause the internal gear to rotate integrally with the sun gear while the one-way clutch rotates integrally with the sun gear.

According to this embodiment, the one-way clutch and the lock mechanism are configured to cooperate together to cause the at least one planetary gear mechanism to effectively function while the motor shaft rotates in the first direction, and to disable the function of the planetary gear mechanism while the motor shaft rotates in the second direction. Particularly, the one-way clutch automatically performs different actions according to the rotation direction of the motor shaft, and thus can efficiently change the action of the lock mechanism in response to the change of the rotation direction of the motor shaft. Owing to such a rational structure, the power tool according to this embodiment can perform an action for which relatively low-speed rotation and/or relatively large-torque output is required while the motor shaft rotates in the first direction, and can perform an action for which relatively high-speed rotation and/or relatively small-torque output is required while the motor shaft rotates in the second direction.

In addition or in the alternative to the preceding embodiments, the gear speed reducer may include a plurality of planetary gear mechanisms arranged in multiple stages. The lock mechanism may be configured to act on the internal gear of a planetary gear mechanism at a second stage or a further downstream stage among the plurality of planetary gear mechanisms. According to this embodiment, the lock mechanism can act on the internal gear in the second or further downstream stage after being decelerated at a first stage, so that load on the lock mechanism can be reduced and thus the durability of the lock mechanism can be improved.

In addition or in the alternative to the preceding embodiments, the power tool may further include a movable member that is operably coupled to the gear speed reducer and that is configured to move in response to driving of the motor. The power tool may be configured to operate in a cycle, which includes a first stroke in which the movable member moves in a prescribed direction and a second stroke in which the movable member moves in a direction opposite to the prescribed direction. The rotation direction of the motor shaft may be changed in response to a change between the first stroke and the second stroke. According to this embodiment, the power tool can output required torque at required speed in each of the first stroke and the second stroke simply by changing the rotation direction of the motor.

In addition or in the alternative to the preceding embodiments, the power tool may be a fastening tool configured to fasten workpieces via a fastener. The fastening tool is a typical example of the power tool that is configured to perform different actions between the first stroke and the second stroke in a fastening operation. According to this embodiment, the fastening tool is provided that can efficiently perform the fastening operation.

In addition or in the alternative to the preceding embodiments, the movable member may be configured to grip a portion of the fastener. The movable member may be configured to move in the prescribed direction from an initial position relative to the workpieces while pulling the fastener in the first stroke. Also, the movable member may be configured to return to the initial position in the direction opposite to the prescribed direction without pulling the fastener in the second stroke. The reduction ratio in the first stroke may be larger than the reduction ratio in the second stroke. According to this embodiment, the fastening tool can output a relatively large torque in the first stroke in which the movable member pulls the fastener, and can efficiently return to the initial position at relatively high speed in the second stroke in which the movable member returns to the initial position without pulling the fastener.

In addition or in the alternative to the preceding embodiments, the power tool may further include a feed screw mechanism that is arranged between the gear speed reducer and the movable member in a transmission path. Further, the feed screw mechanism may be configured to convert rotation of an output shaft of the gear speed reducer into linear motion of the movable member. According to this embodiment, the feed screw mechanism can perform efficient conversion of relatively large torque into linear motion.

In addition or in the alternative to the preceding embodiments, when the motor shaft rotates in one of the normal direction and the reverse direction, the reduction ratio may be at least 2.5 times larger than when the motor shaft rotates in the other of the normal direction and the reverse direction. According to this embodiment, the power tool can perform two actions that are relatively greatly different in speed and torque according to the rotation direction of the motor.

In addition or in the alternative to the preceding embodiments, the power tool may further include a control device that is configured to control operation of the power tool. The control device may be configured to change the rotation direction of the motor in response to recognizing a prescribed event. According to this embodiment, the control device can automatically change the rotation direction of the motor upon recognizing a prescribed event, so that the reduction ratio can be changed properly and efficiently.

A fastening tool 1 according to a representative, non-limiting embodiment of the present disclosure is now described in detail, with reference to the drawings. The fastening tool 1 of this embodiment is configured to fasten workpieces with a fastener 8. The fastener 8 is a known fastener (specifically, a multi-piece swage type fastener) including a pin 81 and a collar 85.

The general structure of the fastening tool 1 is now described.

Figure 1:
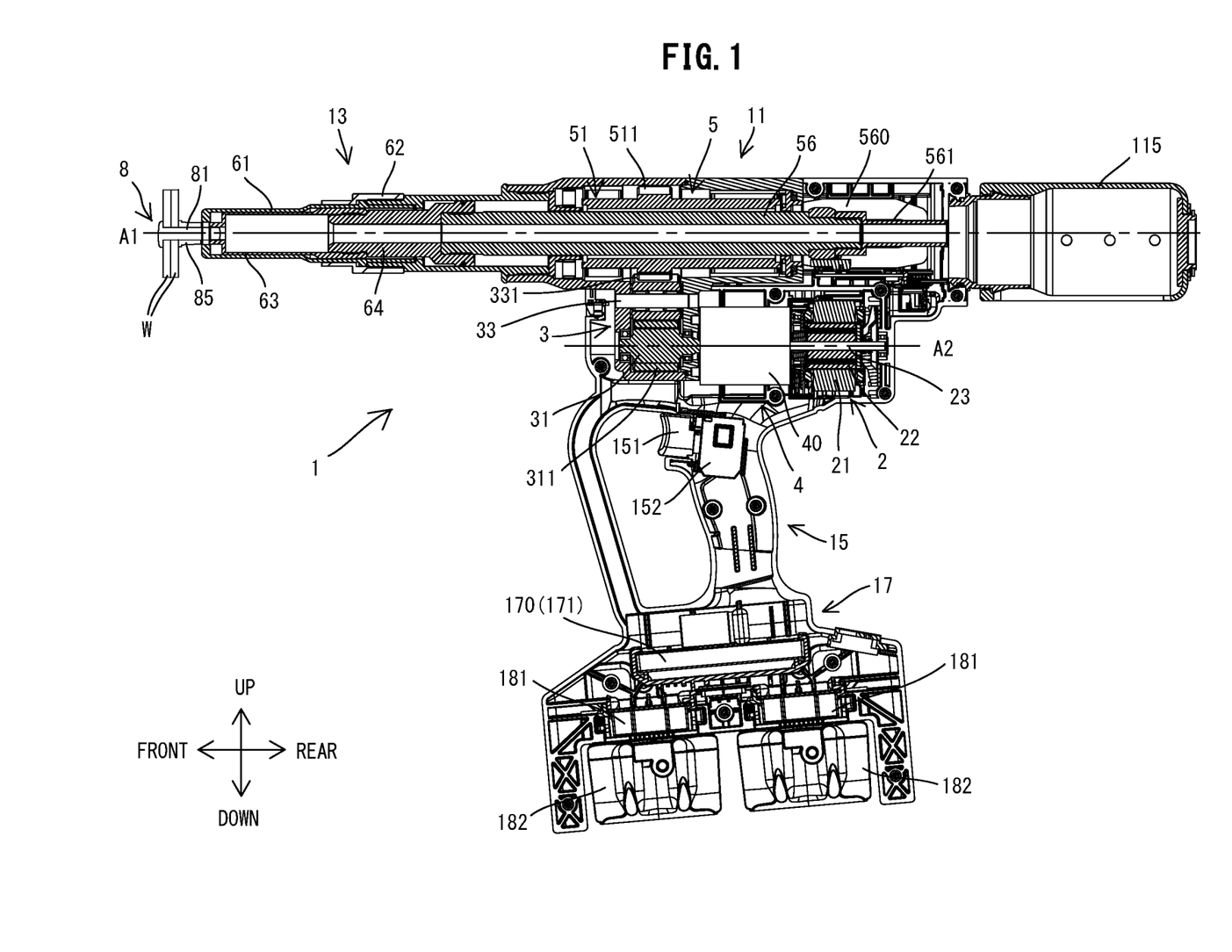
FIG. 1 is a sectional view of a fastening tool.

As shown in FIG. 1, an outer shell of the fastening tool 1 is mainly formed by a body housing 11, a nose 13, a handle 15 and a battery housing 17. The body housing (also referred to as a tool body) 11 has a rectangular box-like shape as a whole and extends along a prescribed driving axis A1. The body housing 11 houses a motor 2 and a driving mechanism 3. The nose 13 protrudes along the driving axis A1 from one end portion of the body housing 11 in its longitudinal direction. The handle 15 protrudes in a direction that intersects (specifically, in a direction substantially orthogonal to) the driving axis A1 from a central portion of the body housing 11 in its longitudinal direction. The handle 15 has a trigger 151 configured to be depressed by a user. The battery housing 17 is connected to a protruding end of the handle 15. A rechargeable battery (or batteries) 182 may be removably received by the battery housing 17.

When the user engages the fastener 8 with a front end portion of the nose 13 and depresses the trigger 151, the motor 2 is driven and the pin 81 is pulled in its axial direction relative to the collar 85 and workpieces W, so that the workpieces W are fastened by the fastener 8.

In the following description, for convenience of explanation, as for the direction of the fastening tool 1, an extending direction of the driving axis A1 (or a longitudinal axis of the body housing 11) is defined as a front-rear direction of the fastening tool 1. In the front-rear direction, the side on which the nose 13 is located is defined as a front side and the opposite side is defined as a rear side. Further, a direction that is orthogonal to the driving axis A1 and that generally corresponds to the extending direction of a longitudinal axis of the handle 15 is defined as an up-down direction. In the up-down direction, a protruding-end side (the battery housing 17 side) of the handle 15 is defined as a lower side, and a base-end side (the body housing 11 side) of the handle 15 is defined as an upper side. A direction that is orthogonal both to the front-rear direction and the up-down direction is defined as a left-right direction.

The detailed structure of the fastening tool 1 is now described.

First, the structures/elements/components disposed within the body housing 11 are described. As shown in FIG. 1, the body housing 11 mainly houses the motor 2 and the driving mechanism 3, which is configured to be driven by the motor 2.

The motor 2 is housed in a lower rear end portion of the body housing 11. In this embodiment, a brushless direct current (DC) motor is employed as the motor 2. The motor 2 includes a stator 21, a rotor 22 and a motor shaft 23 that rotates integrally with the rotor 22. The motor 2 is arranged such that a rotational axis A2 of the motor shaft 23 extends in parallel to the driving axis A1 (i.e. in the front-rear direction) below (specifically, directly below) the driving axis A1. A front end portion of the motor shaft 23 protrudes into a gear case 40 of the speed reducer 4. In this embodiment, the rotor 22 and the motor shaft 23 can selectively rotate in two directions. Specifically, the rotor 22 and the motor shaft 23 can selectively rotate in a normal direction and in a reverse direction. In this embodiment, the normal direction corresponds to a direction of moving a screw shaft 56 and a pin-gripping part 63 (described below) rearward. The reverse direction corresponds to a direction of moving the screw shaft 56 and the pin-gripping part 63 forward. Driving the motor 2 to rotate in the normal direction is hereinafter also referred to as normal driving, and driving the motor 2 to rotate in the reverse direction is also referred to as reverse driving.

The driving mechanism 3 is now described. The driving mechanism 3 is configured to move the pin-gripping part 63 (described below) along the driving axis A1 in the front-rear direction relative to the anvil 61 by power of the motor 2. In this embodiment, the driving mechanism 3 includes a speed reducer 4, a nut-driving gear 311 provided on a first intermediate shaft 31, an idler gear 331 provided on a second intermediate shaft 33, and a ball-screw mechanism 5. The structures of these components/mechanisms are now described in this order.

Figure 2:
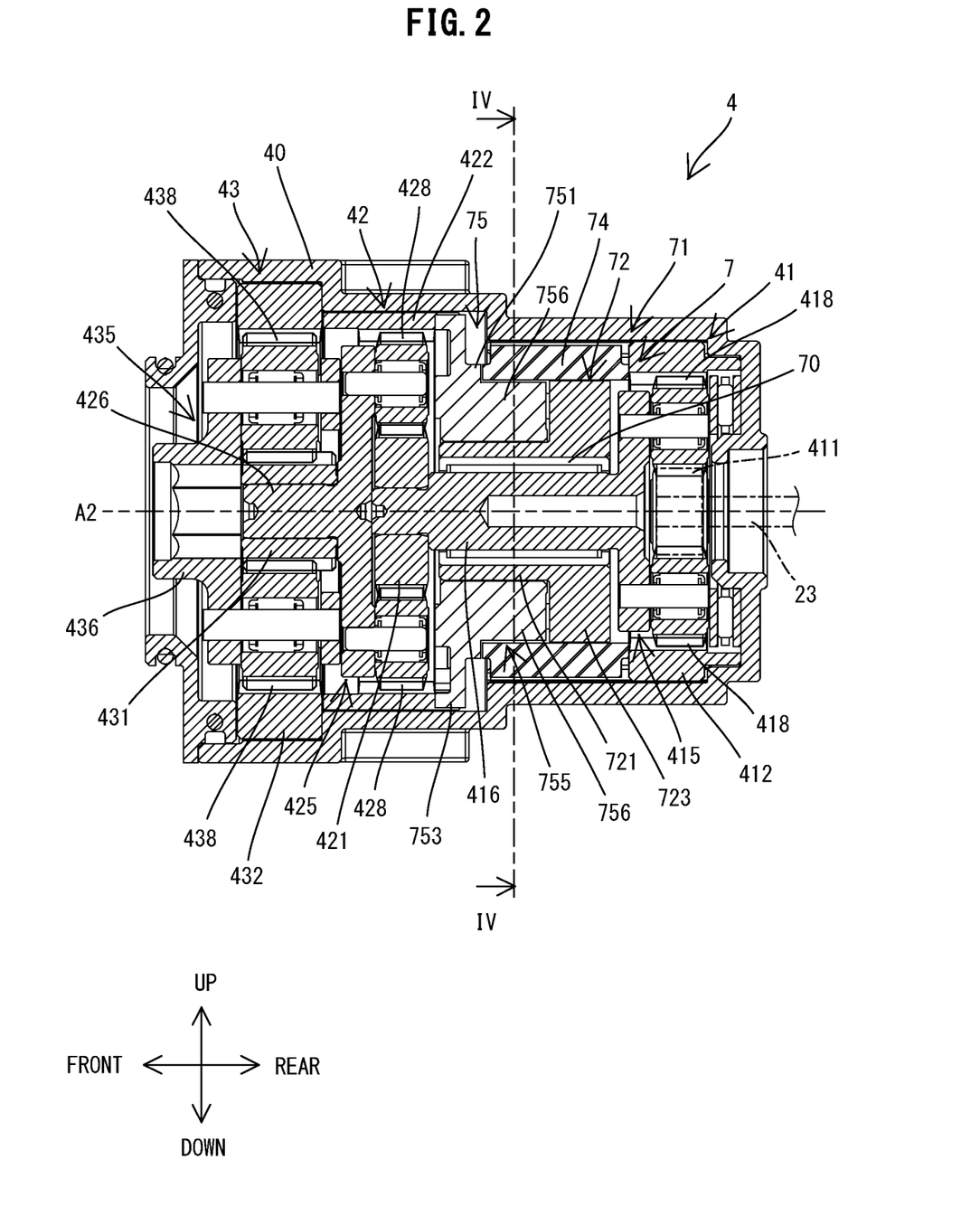
FIG. 2 is a sectional view of a speed reducer.

The speed reducer 4 is disposed coaxially with the motor 2 in front of the motor 2 within the body housing 11. The speed reducer 4 of this embodiment is a speed reducer that utilizes planetary gear mechanisms (epicyclic gearing, epicyclic gear system). The speed reducer 4 is configured to decelerate rotation of the motor shaft 23 and increase torque, according to its reduction ratio (speed reduction ratio), and output the torque to the first intermediate shaft 31. In this embodiment, the speed reducer 4 is structured as a multistage planetary gear reducer. More specifically, as shown in FIG. 2, the speed reducer 4 includes the gear case 40 and three stages (sets) of planetary gear mechanisms 41, 42, 43 housed in the gear case 40. The gear case 40 is non-rotatably supported by the body housing 11.

The first-stage (input-side) planetary gear mechanism 41 includes a sun gear 411, an internal gear (also referred to as a ring gear) 412, a carrier 415, and a plurality of planetary gears 418.

The sun gear 411 is fixed onto (around) a front end portion of the motor shaft 23. In this embodiment, the motor shaft 23 serves as an input shaft for the speed reducer 4. The internal gear 412 is fixedly held within the gear case 40. Thus, the internal gear 412 is not substantially movable in the front-rear direction and is not substantially rotatable around the rotational axis A2, relative to the gear case 40. The planetary gears 418 are supported by the carrier 415 and engaged with the sun gear 411 and the internal gear 412. The carrier 415 has a shaft 416 extending forward along the rotational axis A2. The carrier 415 (the shaft 416) rotates in the same direction as the motor shaft 23 when the motor 2 is driven.

The second-stage planetary gear mechanism 42 includes a sun gear 421, an internal gear (also referred to as a ring gear) 422, a carrier 425, and a plurality of planetary gears 428.

The sun gear 421 is fixed onto (around) a front end portion of the shaft 416 of the first-stage carrier 415. Thus, the sun gear 421 rotates integrally with the carrier 415 in the same direction as the motor shaft 23 when the motor 2 is driven. The internal gear 422 is fitted in the gear case 40. Four projections 423 are formed on a rear end of the internal gear 422 and protrude rearward. The projections 423 are arranged substantially at equal intervals in a circumferential direction of the internal gear 422. The internal gear 422 is not substantially movable in the front-rear direction, but is selectively rotatable around the rotational axis A2, relative to the gear case 40. Whether the internal gear 422 is rotatable or non-rotatable is changed by a reduction-ratio change mechanism 7, depending on the rotation direction of the motor 2. The reduction-ratio change mechanism 7 will be described in detail below. The planetary gears 428 are supported by the carrier 425 and engaged with the sun gear 421 and the internal gear 422. The carrier 425 has a shaft 426 extending forward along the rotational axis A2.

The third-stage (final-stage, output-side) planetary gear mechanism 43 includes a sun gear 431, an internal gear (also referred to as a ring gear) 432, a carrier 435, and a plurality of planetary gears 438.

The sun gear 431 is fixed onto (around) a front end portion of the shaft 426 of the second-stage carrier 425. Like the first-stage internal gear 412, the internal gear 432 is fixedly held within the gear case 40. The planetary gears 438 are supported by the carrier 435 and engaged with the sun gear 431 and the internal gear 432. The carrier 435 has a shaft 436 extending forward along the rotational axis A2. The shaft 436 of the third-stage (final-stage) planetary gear mechanism 43 serves as a final output shaft of the speed reducer 4.

As shown in FIG. 1, the first intermediate shaft 31 is arranged coaxially with the motor shaft 23 and the speed reducer 4 within the body housing 11, and extends forward from the speed reducer 4. The first intermediate shaft 31 is connected to the shaft 436 (see FIG. 2) of the third-stage carrier 435 of the speed reducer 4. The first intermediate shaft 31 is supported rotatably around the rotational axis A2 by two bearings supported by the body housing 11, and configured to rotate integrally with the carrier 435. The nut-driving gear 311 is integrally formed on (around) an outer periphery of the first intermediate shaft 31.

The second intermediate shaft 33 extends in parallel to the first intermediate shaft 31 above (specifically, directly above) the first intermediate shaft 31. The idler gear 331 is supported by the second intermediate shaft 33 via a bearing. The idler gear 331 is thus rotatable around an axis of the second intermediate shaft 33. The idler gear 331 is engaged with the nut-driving gear 311 and a driven gear 511 of a nut 51 (described below), but does not affect the rotation speed ratio between the nut-driving gear 311 and the driven gear 511.

The ball-screw mechanism 5 is a known mechanism that mainly includes the nut 51 and the screw shaft 56. In this embodiment, the ball-screw mechanism 5 is configured to convert rotation of the nut 51 into linear motion of the screw shaft 56 and to linearly move the pin-gripping part 63 described below. The ball-screw mechanism 5 is an example of a feed screw mechanism and is capable of efficiently converting relatively large torque into linear motion.

The nut 51 is supported to be substantially immovable in the front-rear direction and rotatable around the driving axis A1, relative to the body housing 11. The nut 51 has a hollow cylindrical shape and has a driven gear 511 integrally formed on (around) its outer periphery. The nut 51 is supported by a pair of radial bearings supported by the body housing 11 in front of and behind the driven gear 511. The nut-driving gear 311 and the driven gear 511 form a speed-reducing gearing.

The screw shaft 56 is engaged with the nut 51 so as to be substantially non-rotatable around the driving axis A1 and to be movable along the driving axis A1 in the front-rear direction, relative to the body housing 11. More specifically, the screw shaft 56 has an elongate shape, and is inserted through the nut 51 to extend along the driving axis A1. Although not shown in detail, spiral grooves are respectively formed on an inner peripheral surface of the nut 51 and on an outer peripheral surface of the screw shaft 56. Multiple balls are rollably disposed within a track defined by these spiral grooves. The screw shaft 56 is engaged with the nut 51 via these balls. Although not shown in detail, two arms are provided on a rear end portion of the screw shaft 56 and extend from the screw shaft 56 to the left and right. Each of the arms rotatably supports a roller. The rollers are respectively engaged with guide grooves of roller guides fixed to the body housing 11. Each of the rollers can roll along the guide groove in the front-rear direction while being restricted in movement in the up-down direction.

Owing to this structure, when the nut 51 is rotated around the driving axis A1, the screw shaft 56 linearly moves in the front-rear direction relative to the nut 51 and the body housing 11.

An extension shaft 561 is coaxially connected and fixed to the rear end portion of the screw shaft 56. The extension shaft 561 is thus integrated with the screw shaft 56. The screw shaft 56 and the extension shaft 561 integrated with each other are hereinafter also collectively referred to as a driving shaft 560. The driving shaft 560 has a through hole extending therethrough along the driving axis A1. A container 115 is removably attached to a rear end portion of the body housing 115. The container 115 is provided to store a portion (hereinafter referred to as a pintail) of a shaft part of the pin 81 that is separated from the fastener 8. The pintail separated from the fastener 8 may reach the container 115 through the through hole of the driving shaft 560 and may be stored in the container 115.

The nose 13 is now described. As shown in FIG. 1, the nose 13 mainly includes the anvil 61 and the pin-gripping part 63. The anvil 61 is configured to abut on (engage with) the collar 85 of the fastener 8. The anvil 61 is connected to the body housing 11 via a connecting member 62. The pin-gripping part 63 is configured to grip the pin 81 of the fastener 8. The pin-gripping part 63 is held to be movable along the driving axis A1 in the front-rear direction relative to the anvil 61. The structures of the anvil 61 and the pin-gripping part 63 are known and therefore described only briefly here.

The anvil 61 has a hollow cylindrical shape as a whole and has a bore extending along the driving axis A1. The pin-gripping part 63 is held coaxially with the anvil 61 within the bore so as to be slidable within the bore. A front end portion of the bore has a smaller diameter than the other portion of the bore and is configured to abut on (engage with) the collar 85. Although not shown in detail, the pin-gripping part 63 has a plurality of claws (or jaws) which are configured to grip the shaft part of the pin 81. The pin-gripping part 63 is configured such that the gripping force of the claws increases as the pin-gripping part 63 moves rearward from an initial position relative to the anvil 61. A rear end portion of the pin-gripping part 63 is connected to a front end portion of the screw shaft 56 via a connecting member 64. The connecting member 64 has a through hole that extends therethrough along the driving axis A1 and communicates with the through hole of the driving shaft 560.

The handle 15 is now described. As shown in FIG. 1, the handle 15 has an elongate tubular shape. The handle 15 extends contiguously downward from a lower end of a central portion of the body housing 11 in the front-rear direction. The handle 15 is a portion to be held (gripped) by the user. The trigger 151 is provided on an upper end portion of the handle 15 and configured to be depressed by the user. A switch 152 is housed within the handle 15. The switch 152 is normally kept OFF, and turned ON in response to depressing manipulation of the trigger 151. The switch 152 is electrically connected to a controller 170 via wires (not shown). When turned ON, the switch 152 outputs an ON signal to the controller 170.

The battery housing 17 is now described. As shown in FIG. 1, the battery housing 17 is a hollow body having an inverted U-shape which is relatively long in the front-rear direction. The controller 170 is housed in the battery housing 17. The controller 170 includes a control circuit 171, which is configured to control operation of the fastening tool 1. In this embodiment, the control circuit 171 is formed by a microcomputer including a CPU, a ROM and a RAM. Although not shown in detail, the control circuit 171 is mounted on a circuit board housed in a case, together with a driving circuit for the motor 2 etc.

Two battery-mounting parts 181 are provided in a lower end portion of the battery housing 17. Each of the battery-mounting parts 181 is configured to removably receive the battery 182. Thus, in this embodiment, two batteries 182 can be mounted on (connected to) the fastening tool 1. The battery 182 is a rechargeable power source for supplying power to the motor 2 and various other parts of the fastening tool 1. The battery 182 may also be referred to as a battery pack. The structures of the battery-mounting part 181 and the battery 182 are well known and not therefore described here.

The reduction-ratio change mechanism 7 is now described. As described above, the reduction-ratio change mechanism 7 is configured to selectively permit (allow) or prevent rotation of the internal gear 422 of the second-stage planetary gear mechanism 42 of the speed reducer 4, depending on the rotation direction of the motor 2. When the state of the internal gear 422 is switched between a rotatable state, in which rotation of the internal gear 422 is permitted, and a non-rotatable state, in which rotation of the internal gear 422 is prevented (prohibited), the number of effective stages of the speed reducer 4 (i.e., the number of the planetary gear mechanisms that function effectively) and thus the reduction ratio of the speed reducer 4 are changed.

Figure 3:
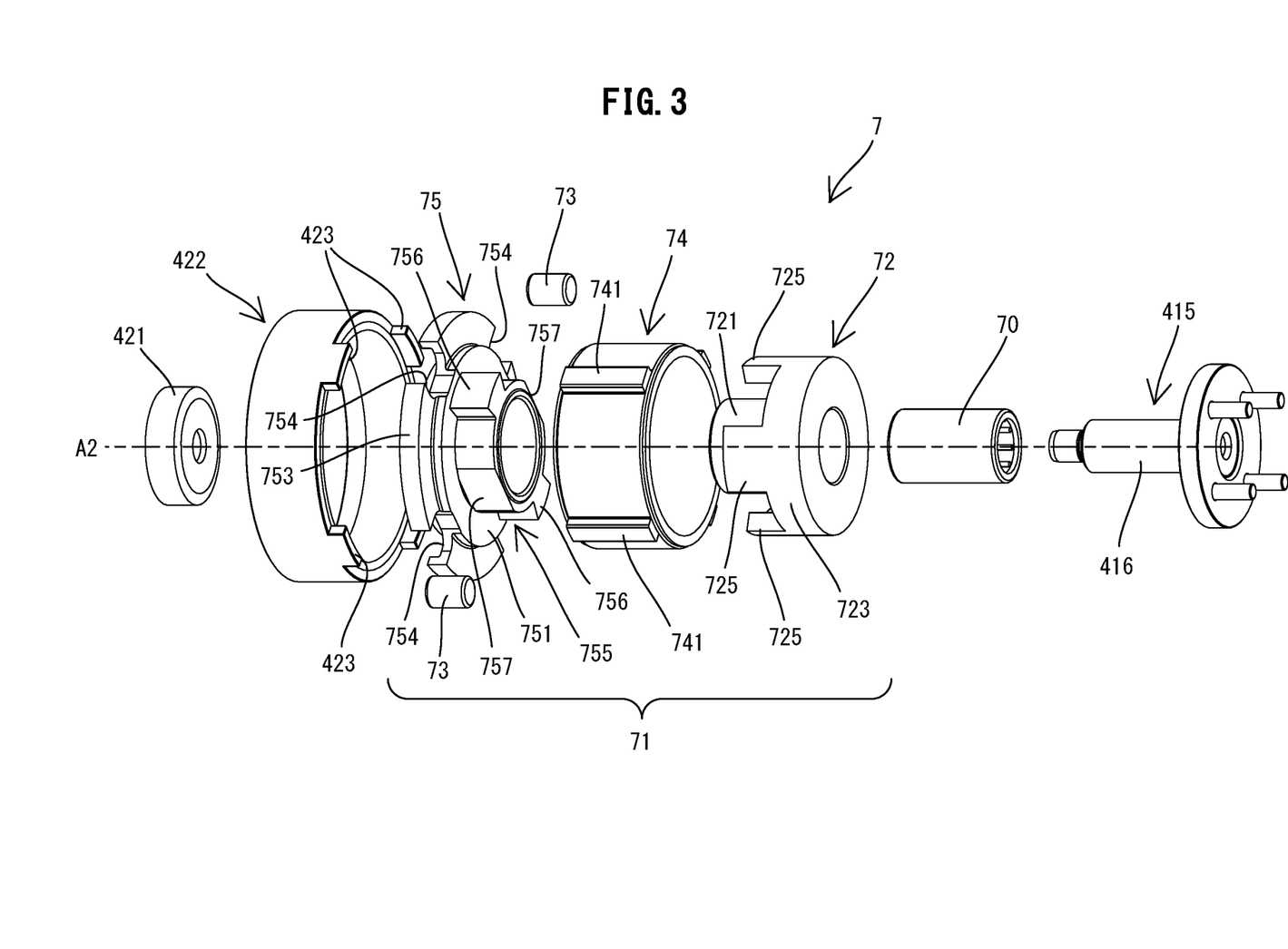
FIG. 3 is a perspective, exploded view showing a carrier of a first stage, a sun gear and an internal gear of a second stage, and a reduction-ratio change mechanism.

As shown in FIGS. 2 and 3, the reduction-ratio change mechanism 7 includes a one-way clutch 70 and a lock mechanism 71.

The one-way clutch 70 is a clutch having a mechanism that transmits rotation in only one direction and idles in the opposite direction. In this embodiment, the one-way clutch 70 is a general-purpose one-way clutch having a well-known structure, in which a plurality of rollers are respectively biased by springs and supported within a cylindrical sleeve. The one-way clutch 70 is mounted onto (around) the shaft 416 of the first-stage carrier 415. When the motor shaft 23 and the shaft 416 rotate in the normal direction, the one-way clutch 70 idles relative to the shaft 416. In other words, when the motor shaft 23 and the shaft 416 rotate in the normal direction, the one-way clutch 70 does not rotate integrally with the carrier 415 and thus does not transmit rotation. On the other hand, when the motor shaft 23 and the shaft 416 rotate in the reverse direction, the one-way clutch 70 rotates integrally with the shaft 416. In other words, when the motor shaft 23 and the shaft 416 rotate in the reverse direction, the one-way clutch 70 is locked to the shaft 416 and rotates integrally with the shaft 416, and thus transmits rotation.

The lock mechanism 71 is configured to switch whether to permit rotation of the second-stage internal gear 422 according to whether the one-way clutch 70 idles relative to the first-stage carrier 415 (the shaft 416) or rotates integrally with the first-stage carrier 415.

The detailed structure of the lock mechanism 71 is now described. As shown in FIGS. 2 to 6, the lock mechanism 71 includes a retainer 72, two rollers 73, a lock sleeve 74 and a lock cam 75.

The retainer 72 is configured to retain the rollers 73 so as to be movable relative to the retainer 72 in a circumferential direction around the rotational axis A2. The retainer 72 includes a hollow cylindrical part 721, a base part 723 and four projections 725. The cylindrical part 721 extends in the front-rear direction along the rotational axis A2 and forms a central portion of the retainer 72. The base part 723 is an annular part protruding radially outward from a rear end portion of the cylindrical part 721. The projections 725 are circular arc walls arranged substantially at equal intervals along an outer edge portion of the base part 723 and extending forward from the outer edge portion of the base part 723. A space is formed (defined) between the cylindrical part 721 and the projections 725 in the radial direction of the retainer 72. A front end of each of the projections 725 is located rearward of a front end of the cylindrical part 721 (i.e. the projection 725 is shorter than the cylindrical part 721 in the front-rear direction).

The cylindrical part 721 of the retainer 72 is press-fitted and fixed onto (around) a sleeve of the one-way clutch 70. Thus, the retainer 72 rotates integrally with the one-way clutch 70. Therefore, the retainer 72 is selectively rotatable relative to the first-stage carrier 415. Specifically, when the motor shaft 23 and the shaft 416 rotate in the normal direction, the retainer 72, which is integral with the one-way clutch 70, idles relative to the shaft 416. In other words, when the motor shaft 23 and the shaft 416 rotate in the normal direction, the retainer 72 does not rotate together with the shaft 416. On the other hand, when the motor shaft 23 and the shaft 416 rotate in the reverse direction, the retainer 72, which is integral with the one-way clutch 70, rotates integrally with the shaft 416.

Each of the rollers 73 is a solid cylindrical member (pin). The roller 73 has a substantially uniform diameter that is smaller than the distance between the adjacent two projections 725 of the retainer 72 and larger than the thickness of the projections 725 in the radial direction. The length of the roller 73 is about the same as the length of protrusion of the projections 725 protruding from the front surface of the base part 723 of the retainer 72. The two rollers 73 are disposed in two diametrically opposed ones of four spaces defined between the projections 725 of the retainer 72 and extend in the front-rear direction.

The lock sleeve 74 is a generally hollow cylindrical member. The lock sleeve 74 is fitted coaxially with the speed reducer 4 in front of the first-stage internal gear 412 within the gear case 40. A plurality of projections 741 protrude radially outward from an outer peripheral surface of the lock sleeve 74. The projections 741 each extend from a front end to a rear end of the lock sleeve 74 in the front-rear direction. The projections 741 are respectively engaged with grooves 401 (see FIG. 4) that are formed on an inner peripheral surface of the gear case 40 and that extend in the front-rear direction. Thus, the lock sleeve 74 is held so as not to rotate relative to the gear case 40.

The lock sleeve 74 is disposed around (radially outward of) the retainer 72. A front end of the lock sleeve 74 is located forward of the front ends of the projections 725 and the rollers 73. A rear end of the lock sleeve 74 is located rearward of a rear end of the retainer 72. Thus, the projections 725 of the retainer 72 and the rollers 73 are entirely disposed within (radially inward of) the lock sleeve 74. The inner diameter of the lock sleeve 74 is set to be substantially equal to or slightly larger than the outer diameter of the base part 723 of the retainer 72. The retainer 72 is selectively rotatable relative to the lock sleeve 74.

The lock cam 75 is operably coupled to the retainer 72 and configured to be selectively rotated by the retainer 72. Further, the lock cam 75 is connected to the second-stage internal gear 422 and configured to rotate integrally with the internal gear 422 around the rotational axis A2 relative to the gear case 40. The lock cam 75 is basically a tubular member that has a through hole having a circular section and extending along the rotational axis A2. The lock cam 75 includes a base part 751, a flange part 753 and a cam part 755.

The base part 751 is a disc-like portion and forms a front half of the lock cam 75. The flange part 753 protrudes radially outward from an outer peripheral surface of the base part 751. The outer diameter of the flange part 753 is about the same as the outer diameter of the second-stage internal gear 422. The flange part 753 has four recesses 754 (see FIG. 3) recessed radially inward from an outer edge of the flange part 753. The recesses 754 are arranged substantially at equal intervals in a circumferential direction of the flange part 753. The recesses 754 are shaped to conform to the projections 423 of the internal gear 422 and always engaged with the projections 423. The lock cam 75 is thus connected to the internal gear 422 for integral rotation by engagement between the recesses 754 and the projections 423.

The cam part 755 protrudes rearward from a rear surface of the base part 751 and forms a rear half of the lock cam 75. The cam part 755 has two projections 756 and two flat parts 757. The projections 756 are disposed at diametrically opposed positions across the rotational axis A2 and protrude radially outward from an outer peripheral surface of the cam part 755. The two flat parts 757 are respectively formed in intermediate positions between the two projections 756 in a circumferential direction of the cam part 755. Portions of the outer peripheral surface of the cam part 755 between the projections 756 and the flat parts 757 are curved surfaces that correspond to an outer peripheral surface of a cylinder. The flat parts 757 are portions of the outer peripheral surface of the cam part 755, and are diametrically opposed to each other across the rotational axis A2. The flat parts 757 extend in parallel to each other and in parallel to the rotational axis A2.

The distance between the flat part 757 and an inner peripheral surface of the lock sleeve 74 in the radial direction is maximum at the center of the flat part 757. This distance (maximum distance) is set to be slightly larger than the diameter of the roller 73. The radial distance between the flat part 757 and the inner peripheral surface of the lock sleeve 74 gradually decreases toward edges of the flat part 757 in the circumferential direction. The radial distance between the edge of the flat part 757 and the inner peripheral surface of the lock sleeve 74 is set to be smaller than the diameter of the roller 73.

The lock cam 75 having the above-described structure is fitted around the cylindrical part 721 of the retainer 72 from the front. The two projections 756 of the lock cam 75 are arranged in two of the four spaces defined between the projections 725 of the retainer 72 in the circumferential direction (specifically, in two spaces in which the rollers 73 are not disposed). The remaining portion of the cam part 755 other than the projections 756 is disposed in the space defined between the cylindrical part 721 and the projections 725 of the retainer 72 in the radial direction. The rollers 73 are each disposed between the flat parts 757 of the cam part 755 of the lock cam 75 and the inner peripheral surface of the lock sleeve 74 in the radial direction. Further, the rollers 73 are each disposed between the rear surface of the base part 751 of the lock cam 75 and the front surface of the base part 723 of the retainer 72 in the front-rear direction.

Operation of the reduction-ratio change mechanism 7 (the one-way clutch 70 and the lock mechanism 71) is now described.

First, the operation in normal driving of the motor 2 is described.

When the motor shaft 23 rotates in the normal direction, the first-stage carrier 415 (the shaft 416) and the second-stage sun gear 421 also rotate in the normal direction. At this time, as described above, the one-way clutch 70 idles relative to the shaft 416 and thus does not transmit rotation to the retainer 72. Therefore, the retainer 72 does not rotate actively.

The second-stage sun gear 421 rotates the second-stage planetary gears 428 engaged therewith. The second-stage planetary gears 428, which are also engaged with the second-stage internal gear 422, rotate the second-stage internal gear 422 in the reverse direction relative to the gear case 40. At this time, the lock cam 75 also rotates in the reverse direction (in the direction of arrows in FIG. 4). Accordingly, each of the rollers 73 relatively moves toward the edge of the flat part 757 in the circumferential direction.

Figure 4:
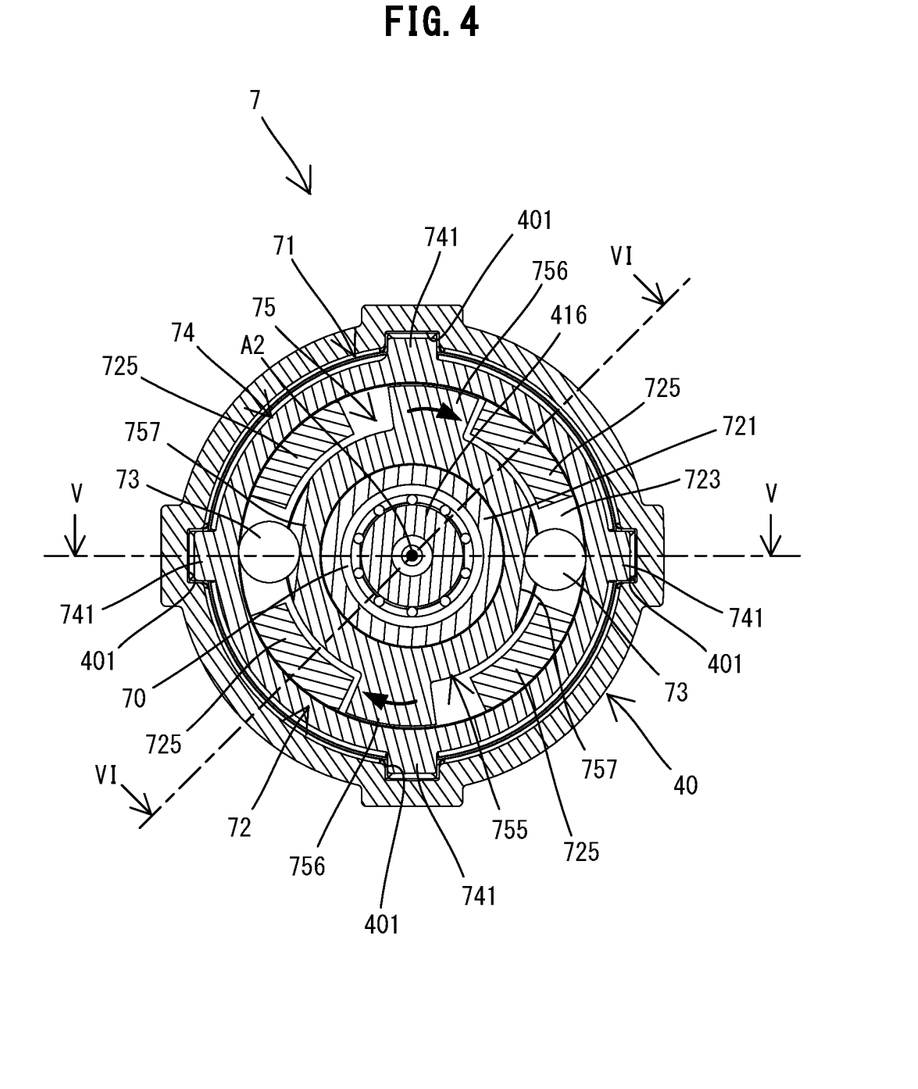
FIG. 4 is a sectional view taken along line IV-IV in FIG. 2, for illustrating an action of a lock mechanism in normal driving of a motor.
Figure 5:
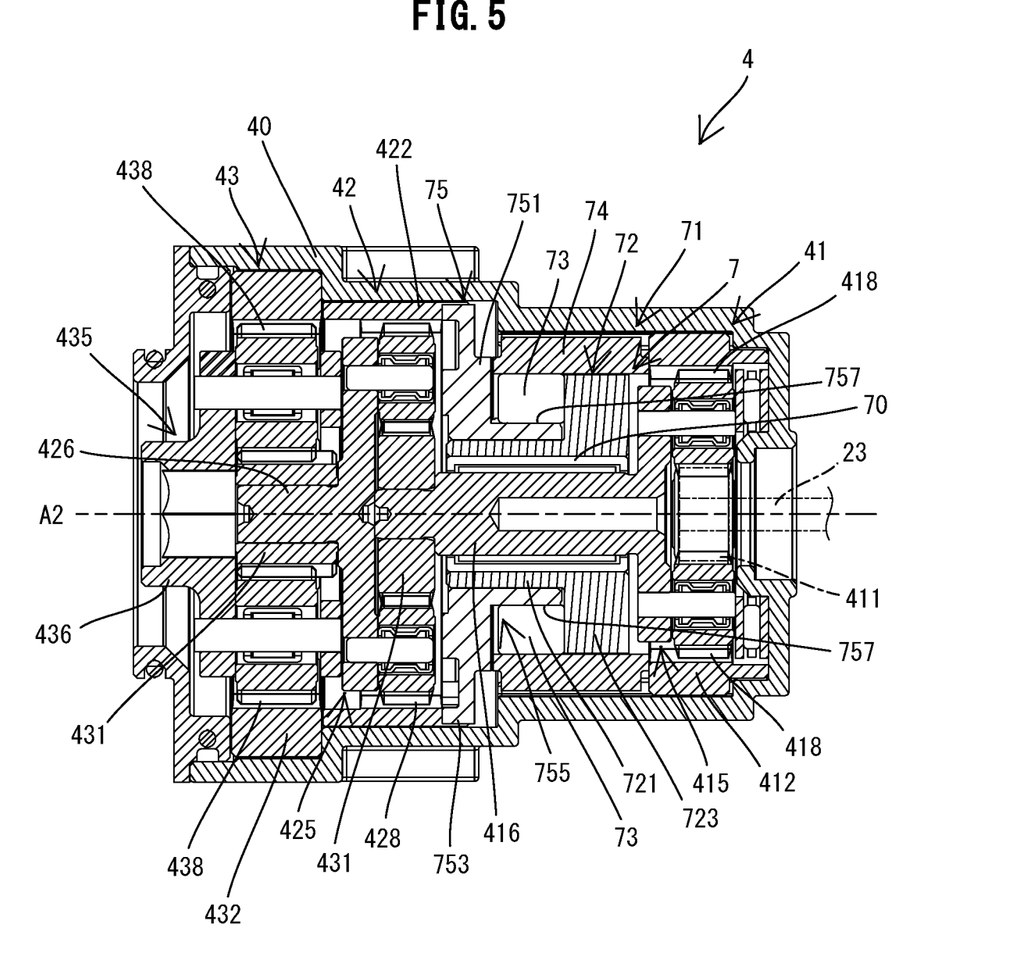
FIG. 5 is a sectional view taken along line V-V in FIG. 4.
Figure 6:
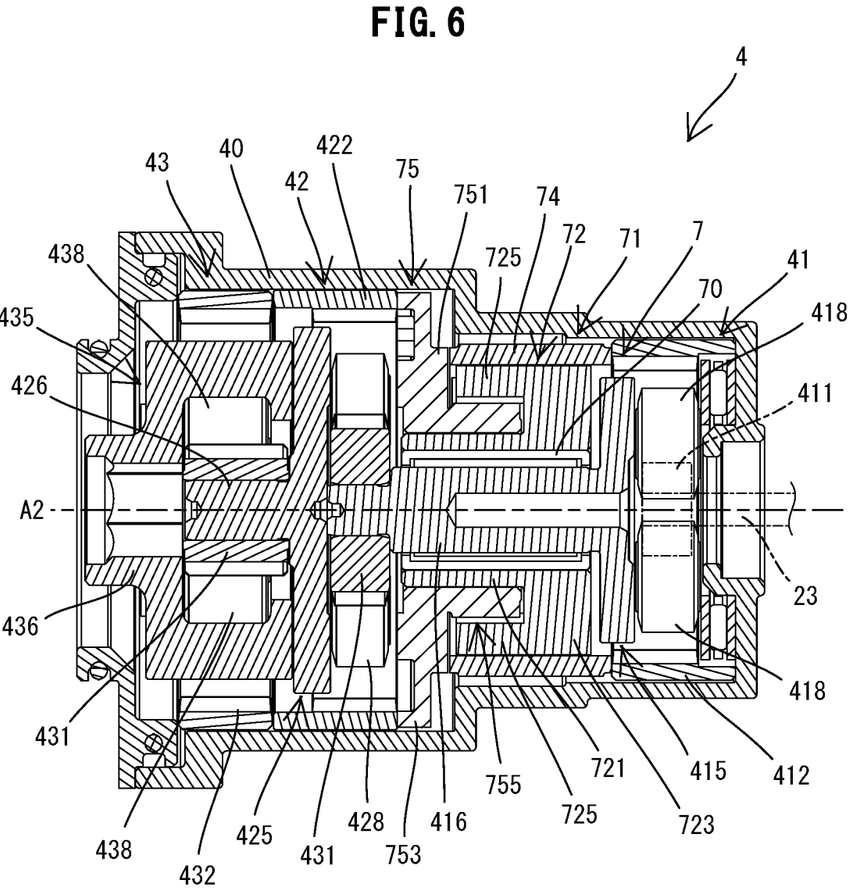
FIG. 6 is a sectional view taken along line VI-VI in FIG. 4.

As shown in FIG. 4, before the projections 756 of the lock cam 75 abut on the projections 725 of the retainer 72, each of the rollers 73 is held like a wedge between the flat part 757 and the inner peripheral surface of the lock sleeve 74 at a position between the center and the edge of the flat part 757. This position of the roller 73 relative to the lock sleeve 74 and the lock cam 75 is hereinafter also referred to as a locking position. Thus, the lock cam 75 is locked to the lock sleeve 74 via the rollers 73 and prevented from rotating relative to the gear case 40. When the lock cam 75 is locked, the internal gear 422 cannot rotate relative to the gear case 40. Accordingly, from then on, the planetary gears 428 revolve around the sun gear 421 while rotating, and the carrier 425 rotates in the normal direction.

As described above, when the motor shaft 23 rotates in the normal direction and the first-stage carrier 415 and the second-stage sun gear 421 rotate relative to the one-way clutch 70, the lock mechanism 71 locks the second-stage internal gear 422 such that the internal gear 422 is non-rotatable. As a result, the lock mechanism 71 causes the second-stage planetary gear mechanism 42 to function effectively. Therefore, the number of effective stages of the speed reducer 4 is three, when the motor shaft 23 rotates in the normal direction.

Next, the operation in reverse driving of the motor 2 is described.

When the motor shaft 23 rotates in the reverse direction, the first-stage carrier 415 (the shaft 416) and the second-stage sun gear 421 also rotate in the reverse direction. At this time, as described above, the one-way clutch 70 is locked to the shaft 416 and transmits rotation of the shaft 416 to the retainer 72. Therefore, the retainer 72 also rotates in the reverse direction (in the direction of arrows shown in FIG. 7).

Figure 7:
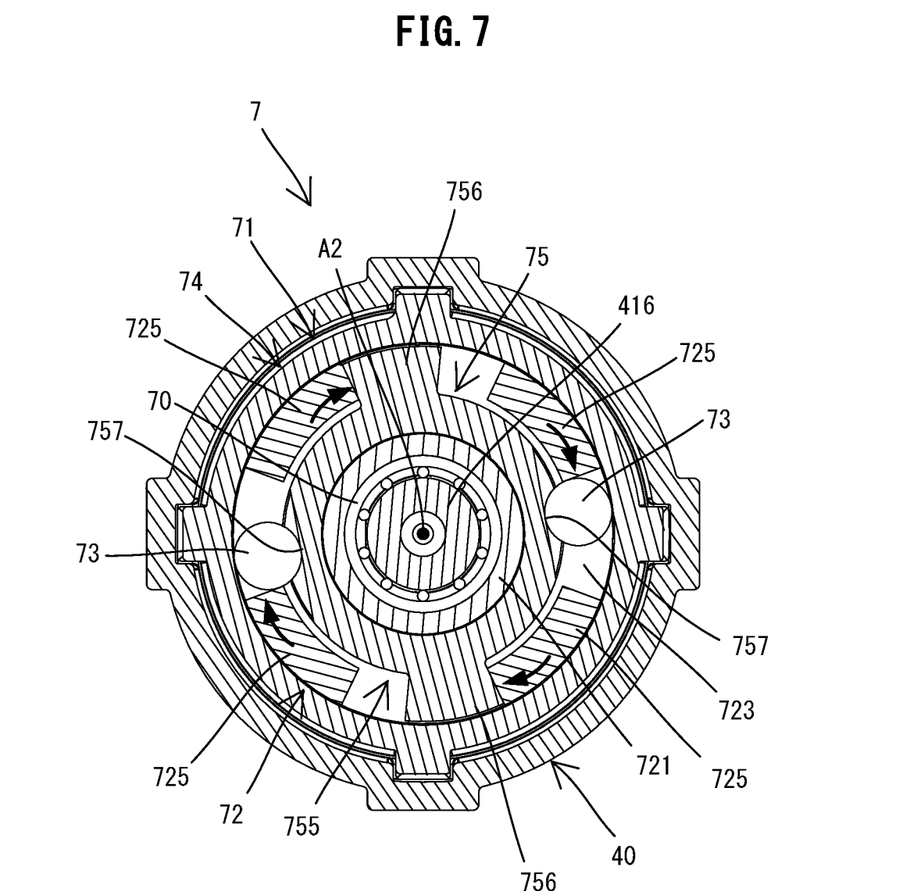
FIG. 7 is a sectional view corresponding to FIG. for illustrating an action of the lock mechanism in reverse driving of the motor.

As shown in FIG. 7, two of the projections 725 of the retainer 72 respectively abut and push the projections 756 of the lock cam 75 in the reverse direction. At the approximately same time, the other two projections 725 respectively abut and push the rollers 73 in the reverse direction. Each of the two projections 725 thus moves the corresponding roller 73 up to a position where the roller 73 is disengaged from between the flat part 757 and the inner peripheral surface of the lock sleeve 74 (a position substantially corresponding to the center of the flat part 757, in this embodiment). This position of the roller 73 relative to the lock sleeve 74 and the lock cam 75 is hereinafter also referred to as an unlocking position. In the unlocking position, the roller 73 is loosely disposed between the flat part 757 and the inner peripheral surface of the lock sleeve 74, so that the lock cam 75 can rotate relative to the lock sleeve 74. Thus, rotation of the retainer 72 is transmitted to the lock cam 75 and the lock cam 75 rotates integrally with the retainer 72 in the reverse direction. As a result, the second-stage internal gear 422 rotates integrally with the first-stage carrier 415 and the second-stage sun gear 421 in the reverse direction.

At this time, the second-stage sun gear 421 attempts to rotate the second-stage planetary gears 428. The second-stage planetary gears 428, however, cannot rotate (on their respective axes) since the sun gear 421 rotates integrally with the second-stage internal gear 422. As a result, the second-stage carrier 425 rotates integrally with the sun gear 421 and the internal gear 422 in the reverse direction. The carrier 425 rotates at the same speed as the sun gear 421 (the first-stage carrier 415).

As described above, when the motor shaft 23 rotates in the reverse direction and the one-way clutch 70 rotates integrally with the first-stage carrier 415 and the second-stage sun gear 421, the lock mechanism 71 causes the second-stage internal gear 422 to rotate at the same speed in the same direction as the sun gear 421. As a result, the lock mechanism 71 disables the functions (the speed reducing function and the torque increasing function) of the second-stage planetary gear mechanism 42. Therefore, the number of effective stages of the speed reducer 4 is two, when the motor shaft 23 rotates in the reverse direction.

As described above, the number of effective stages of the speed reducer 4 is smaller when the motor shaft 23 rotates in the reverse direction than in the normal direction. Accordingly, the reduction ratio of the speed reducer 4 is smaller when the motor shaft 23 rotates in the reverse direction than in the normal direction. Thus, the rotation speed (the output speed of the speed reducer 4) of the shaft 436 (the final output shaft of the speed reducer 4) of the third-stage carrier 435 is higher when the motor shaft 23 rotates in the reverse direction than in the normal direction. Further, the torque outputted from the speed reducer 4 (output torque of the speed reducer 4) is larger when the motor shaft 23 rotates in the normal direction than in the reverse direction. In this embodiment, the speed reducer 4 is configured such that, in normal rotation of the motor shaft 23, the reduction ratio is at least 2.5 times larger than in reverse rotation of the motor shaft 23.

Operation of the fastening tool 1 in performing an operation (hereinafter referred to as a fastening operation) of fastening workpieces W by using the fastener 8 is now described. In the fastening operation, the screw shaft 56 and the pin-gripping part 63 perform one cycle of actions including a first stroke (or initial/forward stroke) and a second stroke (or return/reverse stroke). During the first stroke, the screw shaft 56 and the pin-gripping part 63 move rearward from their initial positions. During the second stroke, the screw shaft 56 and the pin-gripping part 63 move forward to their initial positions.

As shown in FIG. 1, in an initial state in which the trigger 151 is not depressed, the screw shaft 56 (i.e. the driving shaft 560) and the pin-gripping part 63 are located in their initial positions (foremost positions). The user temporarily fixes the fastener 8 to the workpieces W such that a front end portion (the claws) of the pin-gripping part 63 loosely grips the shaft part of the pin 81. When the trigger 151 is manually depressed by the user and the switch 152 is turned ON, the control circuit 171 of the controller 170 starts normal driving of the motor 2 in response to an ON signal from the switch 152. Thus, the first stroke is started.

As described above, in response to the start of rotation of the motor shaft 23 in the normal direction, the reduction-ratio change mechanism 7 locks the second-stage internal gear 422, so that three stages of the speed reducer 4 are effective. Accordingly, the shaft 436 of the speed reducer 4 rotates at relatively low speed and outputs relatively large torque. The torque is transmitted to the nut 51 via the nut-driving gear 311, the idler gear 331 and the driven gear 511 while being further increased. In response to rotation of the nut 51, the screw shaft 56 and the pin-gripping part 63 move rearward relative to the body housing 11 and the nut 51. The shaft part of the pin 81 is firmly gripped by the pin-gripping part 63 and pulled rearward relative to the collar 85 and the workpieces W.

The collar 85 is then deformed and swaged onto the shaft part of the pin 81, and the workpieces W are clamped between the head of the pin 81 and the collar 85. Subsequently, a portion (pintail) of the shaft part of the pin 81 is torn off and separated from the fastener 8. Thus, the operation of fastening the workpieces W is completed. The control circuit 171 stops normal driving of the motor 2 when the screw shaft 56 and the pin-gripping part 63 reach respective predetermined stop positions or when the user releases the trigger 151 to turn off the switch 152. This completes the first stroke. Although not described and shown in detail, the control circuit 171 can determine whether the screw shaft 56 and the pin-gripping part 63 have reached their stop positions, for example, based on detection results of a position detecting device (such as a Hall sensor, an optical sensor and a contact switch).

When the trigger 151 is released by the user and the switch 152 is turned OFF, the control circuit 171 starts reverse driving of the motor 2. Thus, the second stroke is started.

When the motor shaft 23 rotates in the reverse direction, as described above, the reduction-ratio change mechanism 7 rotates the second-stage internal gear 422 integrally with the sun gear 421, so that two stages of the speed reducer 4 are effective (the number of effective stages of the speed reducer 4 is changed to two). Accordingly, the shaft 436 of the speed reducer 4 rotates at higher speed than in the first stroke and outputs lower torque than in the first stroke. The torque is transmitted to the nut 51 via the nut-driving gear 311, the idler gear 331 and the driven gear 511. The nut 51 rotates in a direction opposite to that in the first stroke, so that the screw shaft 56 and the pin-gripping part 63 are moved forward relative to the body housing 11 and the nut 51. The control circuit 171 stops reverse driving of the motor 2 when the screw shaft 56 and the pin-gripping part 63 reach their respective initial positions. This completes the second stroke. The control circuit 171 can determine whether the screw shaft 56 and the pin-gripping part 63 have reached their initial positions, for example, based on detection results of a position detecting device, in the same manner as when determining whether they have reached their stop positions.

As described above, the motor 2 (the motor shaft 23) of the fastening tool 1 according to this embodiment can selectively rotate in two directions, that is, in the normal direction and in the reverse direction. Further, the speed reducer 4 is configured such that the reduction ratio is changed in response to the change of the rotation direction of the motor shaft 23. The output speed and the output torque of the speed reducer 4 and thus the moving speed and the pulling force of the pin-gripping part 63 for pulling the pin 81 are changed according to whether the motor shaft 23 rotates in the normal direction or in the reverse direction. Therefore, the fastening tool 1 can perform the two actions, which are different in the moving speed and the pulling force of the pin-gripping part 63 for pulling the pin 81, according to the rotation direction of the motor shaft 23.

Since the reduction-ratio change mechanism 7 changes the reduction ratio, the control circuit 171 need not control the rotation speed of the motor 2. This allows the control circuit 171 to drive the motor 2 with high efficiency at all times. Particularly, in this embodiment, the control circuit 171 automatically changes the driving mode of the motor 2 (the rotation direction of the motor shaft 23) upon recognizing a particular event (specifically, a change in the depressing state of the trigger 151, that is, ON/OFF switching of the switch 152). Thus, the reduction ratio can be changed properly and efficiently in response to the change of the rotation direction of the motor shaft 23.

The fastening tool 1 is a typical example of a power tool that is configured to perform different actions between the first stroke and the second stroke in the fastening operation. In the first stroke, the pin-gripping part 63 moves rearward from the initial position while pulling the pin 81, and in the second stroke, the pin-gripping part 63 moves forward to the initial position without pulling the pin 81. The reduction ratio in the first stroke is larger than that in the second stroke. Therefore, the fastening tool 1 can output a relatively large torque in the first stroke, in which a relatively large force is required to pull the pin 81. In addition, the fastening tool 1 can efficiently return the pin-gripping part 63 to the initial position at relatively high speed in the second stroke, in which a large force is not particularly required. Thus, the fastening tool 1 can efficiently perform the fastening operation.

Particularly, in this embodiment, in normal rotation of the motor shaft 23, the reduction ratio is at least 2.5 times larger than in reverse rotation of the motor shaft 23, so that the moving speed and the pulling force of the pin-gripping part 63 for pulling the pin 81 can be made relatively significantly different between the first stroke and second stroke.

Further, in this embodiment, the speed reducer 4 is a planetary gear reducer including three stages (sets) of the planetary gear mechanisms 41, 42, 43. The planetary gear reducer is small in size and capable of providing a large reduction ratio, compared with a gear speed reducer including a train of spur gears or other gears. In this embodiment, the speed reducer 4, which is a multi-stage planetary gear reducer, can provide a particularly large reduction ratio. Further, the reduction ratio of the speed reducer 4 can be rationally changed by changing the number of the planetary gear mechanisms 41, 42, 43 that function effectively (i.e., the number of the effective stages).

In this embodiment, the one-way clutch 70 and the lock mechanism 71 are configured to cooperate, in normal driving of the motor 2, to cause the second-stage planetary gear mechanism 42 to effectively function, and in reverse driving of the motor 2, to disable the function of the second-stage planetary gear mechanism 42. Particularly, the one-way clutch 70 automatically performs different actions according to the rotation direction of the motor shaft 23. Therefore, the one-way clutch 70 can efficiently change the action of the lock mechanism 71 in response to the change of the rotation direction of the motor shaft 23. Further, the lock mechanism 71 is configured such that the rollers 73 lock and unlock the lock cam 75 by moving between the locking position and the unlocking position in the circumferential direction. Owing to this configuration, the lock mechanism 71 can be made compact in the front-rear direction and the radial direction. Furthermore, the rollers 73 can exhibit the wedge effect by slight movement in the circumferential direction and thereby reliably lock the lock cam 75 and thus the internal gear 422.

Further, the lock mechanism 71 acts on the sun gear 421 and the internal gear 422 in the second-stage planetary gear mechanism 42, in which the rotation speed is lower than in the first-stage planetary gear mechanism 42 and the torque is smaller than in the third-stage planetary gear mechanism 42. This configuration can reduce load on the lock mechanism 71 and thus improve the durability of the lock mechanism 71.

Correspondences between the features of the above-described embodiment and the features of the disclosure are as follows. However, the features of the above-described embodiment are merely exemplary and do not limit the features of the present disclosure.

The fastening tool 1 is an example of a "power tool". The motor 2 and the motor shaft 23 are examples of a "motor" and a "motor shaft", respectively. The speed reducer 4 is an example of a "gear speed reducer". Each of the planetary gear mechanisms 41, 42, 43 is an example of a "planetary gear mechanism". Each of the sun gears 411, 421, 431 is an example of a "sun gear". Each of the internal gears 412, 422, 432 is an example of an "internal gear". Each of the carriers 415, 425, 435 is an example of a "carrier". Each of the planetary gears 418, 428, 438 is an example of a "planetary gear". The one-way clutch 70 is an example of a "one-way clutch". The lock mechanism 71 is an example of a "lock mechanism". The pin-gripping part 63 is an example of a "movable member". The fastener 8 is an example of the "fastener". The ball-screw mechanism 5 is an example of a "feed screw mechanism". The control circuit 171 of the controller 170 is an example of a "control device".

The above-described embodiment is a mere example and the power tool according to the present disclosure is not limited to the fastening tool 1 of the above-described embodiment. For example, the following modifications may be made. At least one of these modifications can be employed in combination with any of the fastening tool 1 of the above-described embodiment and the claimed features.

For example, a brushed motor may be employed as the motor 2, in place of the brushless motor. The motor 2 may be driven by power supplied not from the battery 182 but from an external AC power source.

In the driving mechanism 3, another type of feed screw mechanism that includes a nut having a female thread on its inner periphery and a screw shaft having a male thread on its outer periphery and directly engaged with the nut may be employed in place of the ball-screw mechanism 5. The ball-screw mechanism 5 may be configured such that the screw shaft 56 is restricted in movement in the front-rear direction and supported to be rotatable around the driving axis A1, while the nut 51 moves in the front-rear direction along with rotation of the screw shaft 56. In this case, the pin-gripping part 63 may be directly or indirectly connected to the nut 51, which serves as the final output shaft. The idler gear 331 disposed between the nut-driving gear 311 of the first intermediate shaft 31 and the driven gear 511 of the nut 51 may be omitted, and the nut-driving gear 311 and the driven gear 511 may be directly engaged with each other, or a different gear may be disposed therebetween.

The number of the stages of the speed reducer 4 (i.e. the number of the planetary gear mechanisms included in the speed reducer 4) and the structures of the planetary gear mechanisms 41, 42, 43 may be appropriately changed. For example, the planetary speed reducer 4 may include a single planetary gear mechanism, or two or four or more planetary gear mechanisms. In an embodiment that employs a single planetary gear mechanism, the number of effective stages may be switched between zero and one, in response to a change of the rotation direction of the motor 2. The number of effective stages may be changed by axial movement of any one of the internal gears 412, 422, 432. Further, a gear speed reducer including a gear train (a train of spur gears, helical gears, bevel gears or other similar gears) other than a planetary gear mechanism may be employed in place of the speed reducer 4. In such a modification, the reduction ratio can be changed, for example, by selectively engaging a specific gear, which is slidably arranged, with one of two gears having a different number of teeth.

The reduction-ratio change mechanism 7 may be appropriately changed as long as it can operate in response to a change of the rotation direction of the motor shaft 23 and switch the reduction ratio of the speed reducer 4. For example, the reduction-ratio change mechanism 7 may be configured to move any one of the internal gears 412, 422, 432 of the speed reducer 4 in the axial direction by using a gear train that is operably coupled to the motor shaft 23 and the speed reducer 4 (or the gear speed reducer of the above-described modifications).

The one-way clutch 70 may be changed to a one-way clutch having any other structure (such as a one-way clutch including balls). The shape, arrangement and number of components of the lock mechanism 71 may also be appropriately changed. For example, three or more rollers 73 may be provided. The number of the projections 756 of the lock cam 75 and the number of the projections 725 of the retainer 72 may also be changed. The lock sleeve 74 may be omitted, and the rollers 73 may be disposed between the inner periphery of the gear case 40 and the flat parts 757 of the lock cam 75 so as to be movable between the locking position and the unlocking position. Further, the lock cam 75 and the internal gear 422 may be integrally formed as a single (inseparable) member.

In the above-described embodiment, the control circuit 171 is formed by a microcomputer including a CPU. However, the control circuit 171 may be formed, for example, by a programmable logic device such as an ASIC (Application Specific Integrated Circuit) and an FPGA (Field Programmable Gate Array). A plurality of control circuits may be provided to control driving of the motor 2. Further, the control circuit 171 may switch the driving mode of the motor 2 in response to not only the above-described event, but, for example, manipulation of a manipulation part (such as a push button switch and a touch screen) that is separately provided from the trigger 151.

The fastening tool 1 may be configured to fasten the workpieces W by using a fastener of a different type from the fastener 8 of the above-described embodiment (such as a blind rivet and a multi-piece swage type fastener of a shaft-retaining type). The fastening tool 1 may be compatible with plural kinds of fasteners by replacing the anvil 61 and the pin-gripping part 63.

In the above-described embodiment, the fastening tool 1 is described as an example of the power tool of the present disclosure, but the present disclosure may also be applied to other power tools that perform different actions according to the rotation direction of the motor. For example, the power tool may be embodied as pruning shears (pruning scissors, clippers) having a fixed blade and a movable blade that is configured to pivot on a prescribed axis between a closed position and an open position relative to the fixed blade.

Such pruning shears may operate in a cycle that includes a first stroke in which the movable blade pivots from the closed position to the open position and a second stroke in which the movable blade returns from the open position to the closed position while cutting a twig/branch of a plant. It is therefore preferable that the movable blade promptly moves to the open position in the first stroke and exhibits a relatively large cutting force in the second stroke. Accordingly, the pruning shears may be configured such that the rotation direction of the motor is changed in response to a change between the first stroke and the second stroke and such that the reduction ratio of the speed reducer in the second stroke is changed to be larger than that in the first stroke.

The power tool is not limited to a power tool that operates, like the fastening tool 1 and the above-described pruning shears, in a cycle with a first stroke in which a movable member moves in a prescribed direction and a second stroke in which the movable member moves in a direction opposite to the prescribed direction. For example, the power tool may be embodied as a rotary tool that rotationally drives an output shaft around a driving axis with a tool accessory removably coupled to the output shaft. In the rotary tool, the rotation direction of the output shaft and the tool accessory is reversed in response to a change of the rotation direction of the motor. Therefore, the rotary tool can be configured to perform different actions according to the rotation direction of the tool accessory by changing the reduction ratio of the speed reducer in response to a change of the rotation direction of the motor.

Further, in view of the nature of the present disclosure and the above-described embodiment and its modifications, the following features are provided. At least one of the following features can be employed in combination with at least one of the above-described embodiment, its modifications and the claimed features.

(Aspect 1)

The gear speed reducer includes three stages of planetary gear mechanisms, a second-stage sun gear is fixed onto a shaft of a first-stage carrier in the three stages of the planetary gear mechanisms, and the one-way clutch is mounted onto the shaft of the first-stage carrier.

(Aspect 2)

The power tool further includes a housing that houses the motor and the gear speed reducer, the internal gear is selectively rotatable around a first axis relative to the housing, the lock mechanism includes:

a tubular lock sleeve that is non-rotatable around the first axis relative to the housing;

a lock cam that is connected to the internal gear, that is selectively rotatable integrally with the internal gear around the first axis relative to the lock sleeve, and that is at least partially arranged radially inside the lock sleeve;

a retainer that is at least partially arranged radially inside the lock sleeve, and that is selectively rotatable integrally with the one-way clutch around the first axis relative to the lock sleeve; and at least one roller that is retained between the lock sleeve and the lock cam in the radial direction by the retainer, that is configured to selectively move between a locking position and an unlocking position in a circumferential direction around the first axis relative to the lock sleeve and the lock cam, the roller at the locking position being held between the lock sleeve and the lock cam to non-rotatably lock the lock cam relative to the lock sleeve, the roller at the unlocking position being loosely disposed between the lock sleeve and the lock cam to permit rotation of the lock cam relative to the lock sleeve, in response to rotation of the motor shaft in the first direction, the at least one roller relatively moves to the locking position as the internal gear and the lock cam are rotated around the first axis via the planetary gears in response to rotation of the sun gear, and thereby non-rotatably locks the internal gear via the lock cam, and in response to rotation of the motor shaft in the second direction, the retainer rotates integrally with the one-way clutch and rotates the internal gear integrally with the sun gear via the lock cam.

The body housing 11, the lock sleeve 74, the lock cam 75, the retainer 72 and the roller 73 are examples of a "housing", a "lock sleeve", a "lock cam", a "retainer" and a "roller", respectively.

(Aspect 3)

The at least one roller is configured to non-rotatably lock the lock cam by a wedge effect in response to the at least one roller being placed at the locking position.

DESCRIPTION OF THE NUMERALS

1: fastening tool, 11: body housing, 115: container, 13: nose, 15: handle, 151: trigger, 152: switch, 17: battery housing, 170: controller, 171: control circuit, 181: battery-mounting part, 182: battery, 2: motor, 21: stator, 22: rotor, 23: motor shaft, 3: driving mechanism, 31: first intermediate shaft, 311: nut-driving gear, 33: second intermediate shaft, 331: idler gear, 4: speed reducer, 40: gear case, 401: groove, 41, 42, 43: planetary gear mechanism, 411, 421, 431: sun gear, 412, 422, 432: internal gear, 423: projection, 415, 425, 435: carrier, 416, 426, 436: shaft, 418, 428, 438: planetary gear, 5: ball-screw mechanism, 51: nut, 511: driven gear, 56: screw shaft, 560: driving shaft, 561: extension shaft, 61: anvil, 62: connecting member, 63: pin-gripping part, 64: connecting member, 7: reduction-ratio change mechanism, 70: one-way clutch, 71: lock mechanism, 72: retainer, 721: cylindrical part, 723: base part, 725: projection, 73: roller, 74: lock sleeve, 741: projection, 75: lock cam, 751: base part, 753: flange part, 754: recess, 755: cam part, 756: projection, 757: flat part, 8: fastener, 81: pin, 85: collar, A1: driving axis, A2: rotational axis, W: workpiece

What is claimed is:

1. A power tool, comprising:

a motor having a motor shaft that is rotatable in a normal direction and in a reverse direction;

a gear speed reducer that (i) is operably coupled to the motor shaft and (ii) includes at least one planetary gear mechanism, each of the at least one planetary gear mechanism including a sun gear, an internal gear, a carrier and a plurality of planetary gears;

a one-way clutch that is (i) in a transmission path from the motor shaft to a first sun gear of the at least one planetary gear mechanism and (ii) configured to permit rotation of the first sun gear relative to the one-way clutch while the motor shaft rotates in a first direction and to rotate integrally with the first sun gear while the motor shaft rotates in a second direction, the first direction being one of the normal direction and the reverse direction, the second direction being the other of the normal direction and the reverse direction; and a lock mechanism that is (i) operably coupled to the one-way clutch and (ii) configured to lock a first internal gear of the at least one planetary gear mechanism to be non-rotatable while the one-way clutch permits the relative rotation of the first sun gear and to cause the first internal gear to rotate integrally with the first sun gear while the one-way clutch rotates integrally with the first sun gear, wherein the gear speed reducer is configured such that a reduction ratio of the gear speed reducer is changed in response to (i) a change of a rotation direction of the motor shaft and (ii) a change of the number of the least one planetary gear mechanism that functions effectively.

2. The power tool as defined in claim 1, wherein:
the at least one planetary gear mechanism includes a plurality of planetary gear mechanisms arranged in multiple stages, and
the lock mechanism is configured to act on the internal gear of a planetary gear mechanism at a second stage or a further downstream stage among the plurality of planetary gear mechanisms.

3. The power tool as defined in claim 1, further comprising:
a movable member that is operably coupled to the gear speed reducer and that is configured to move in response to driving of the motor,
wherein:
the power tool is configured to operate in a cycle, the cycle including a first stroke in which the movable member moves in a prescribed direction and a second stroke in which the movable member moves in a direction opposite to the prescribed direction, and
the rotation direction of the motor shaft is changed in response to a change between the first stroke and the second stroke.

4. The power tool as defined in claim 3, wherein the power tool is a fastening tool configured to fasten workpieces via a fastener.

5. The power tool as defined in claim 4, wherein:
the movable member is configured to grip a portion of the fastener,
the movable member is configured to move in the prescribed direction from an initial position relative to the workpieces while pulling the fastener in the first stroke, and to return to the initial position in the direction opposite to the prescribed direction without pulling the fastener in the second stroke, and
the reduction ratio in the first stroke is larger than the reduction ratio in the second stroke.

6. The power tool as defined in claim 5, further comprising:
a feed screw mechanism that is arranged between the gear speed reducer and the movable member in a transmission path, and that is configured to convert rotation of an output shaft of the gear speed reducer into linear motion of the movable member.

7. The power tool as defined in claim 3, wherein:
the at least one planetary gear mechanism includes a plurality of planetary gear mechanisms arranged in multiple stages, and
the lock mechanism is configured to act on the internal gear of a planetary gear mechanism at a second stage or a further downstream stage among the plurality of planetary gear mechanisms.

8. The power tool as defined in claim 3, wherein:
when the motor shaft rotates in one of the normal direction and the reverse direction, the reduction ratio is at least 2.5 times larger than when the motor shaft rotates in the other of the normal direction and the reverse direction.

9. The power tool as defined in claim 3, further comprising:
a control device that is configured to control operation of the power tool,
wherein the control device is configured to change the rotation direction of the motor in response to recognizing a prescribed event.

10. The power tool as defined in claim 1, wherein:
when the motor shaft rotates in one of the normal direction and the reverse direction, the reduction ratio is at least 2.5 times larger than when the motor shaft rotates in the other of the normal direction and the reverse direction.

11. The power tool as defined in claim 1, further comprising:
a control device that is configured to control operation of the power tool,
wherein the control device is configured to change the rotation direction of the motor in response to recognizing a prescribed event.

* * * * *